United States Patent
Zheng

(10) Patent No.: US 11,696,162 B2
(45) Date of Patent: *Jul. 4, 2023

(54) NETWORK FEATURE TESTER

(71) Applicant: T-Mobile USA, Inc., Bellevue, WA (US)

(72) Inventor: Pei Zheng, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,322

(22) Filed: Jul. 18, 2022

(65) Prior Publication Data

US 2022/0353717 A1    Nov. 3, 2022

Related U.S. Application Data

(63) Continuation of application No. 17/111,308, filed on Dec. 3, 2020, now Pat. No. 11,418,984.

(51) Int. Cl.
*H04W 24/08* (2009.01)
*H04W 24/02* (2009.01)
*H04L 43/50* (2022.01)

(52) U.S. Cl.
CPC ............ *H04W 24/08* (2013.01); *H04L 43/50* (2013.01); *H04W 24/02* (2013.01)

(58) Field of Classification Search
CPC ...... H04W 24/08; H04W 43/50; H04W 24/02
USPC ........................................................ 370/252
See application file for complete search history.

(56) References Cited

U.S. PATENT DOCUMENTS

| | | |
|---|---|---|
| 9,077,780 B2 | 7/2015 | Dixon et al. |
| 9,201,572 B2 | 12/2015 | Lyon et al. |
| 9,436,580 B2 | 9/2016 | Manion et al. |
| 2016/0275523 A1 | 9/2016 | McNea et al. |
| 2016/0309298 A1 | 10/2016 | Dupray et al. |
| 2020/0107258 A1 | 4/2020 | Wu |

OTHER PUBLICATIONS

U.S. Appl. No. 17/111,308, Notice of Allowance dated Apr. 11, 2022, 28 pages.

*Primary Examiner* — Gbemileke J Onamuti
(74) *Attorney, Agent, or Firm* — Han Santos, PLLC

(57) ABSTRACT

Methods, systems, and apparatus, including computer programs encoded on a computer storage medium, for implementing a network feature tester are disclosed. In one aspect, a method includes the actions of selecting computing devices that are configured to communicate with a wireless carrier network based on the computing devices having a common characteristic. The actions further include identifying a subset of the computing devices that are likely to communicate with a same base station of the wireless carrier network during a first period of time and a second period of time. The actions further include determining first monitoring data during the first period of time. The actions further include adjusting a characteristic of the same base station. The actions further include determining second monitoring data during the second period of time. The actions further include determining an effect that adjusting the characteristic has on the wireless carrier network.

20 Claims, 3 Drawing Sheets

NETWORK FEATURE TESTER

CROSS-REFERENCE TO RELATED APPLICATION

This application is a continuation of U.S. application Ser. No. 17/111,308, filed Dec. 3, 2020, which is incorporated by reference.

BACKGROUND

A/B testing is a user experience research methodology. A/B tests may include a randomized experiment with an A variant and a B variant. An A/B test may include an application of statistical hypothesis testing. A/B testing may be used to compare two versions of a single variable, typically by testing a subject's response to variant A against variant B and determining which of the two variants is more effective.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
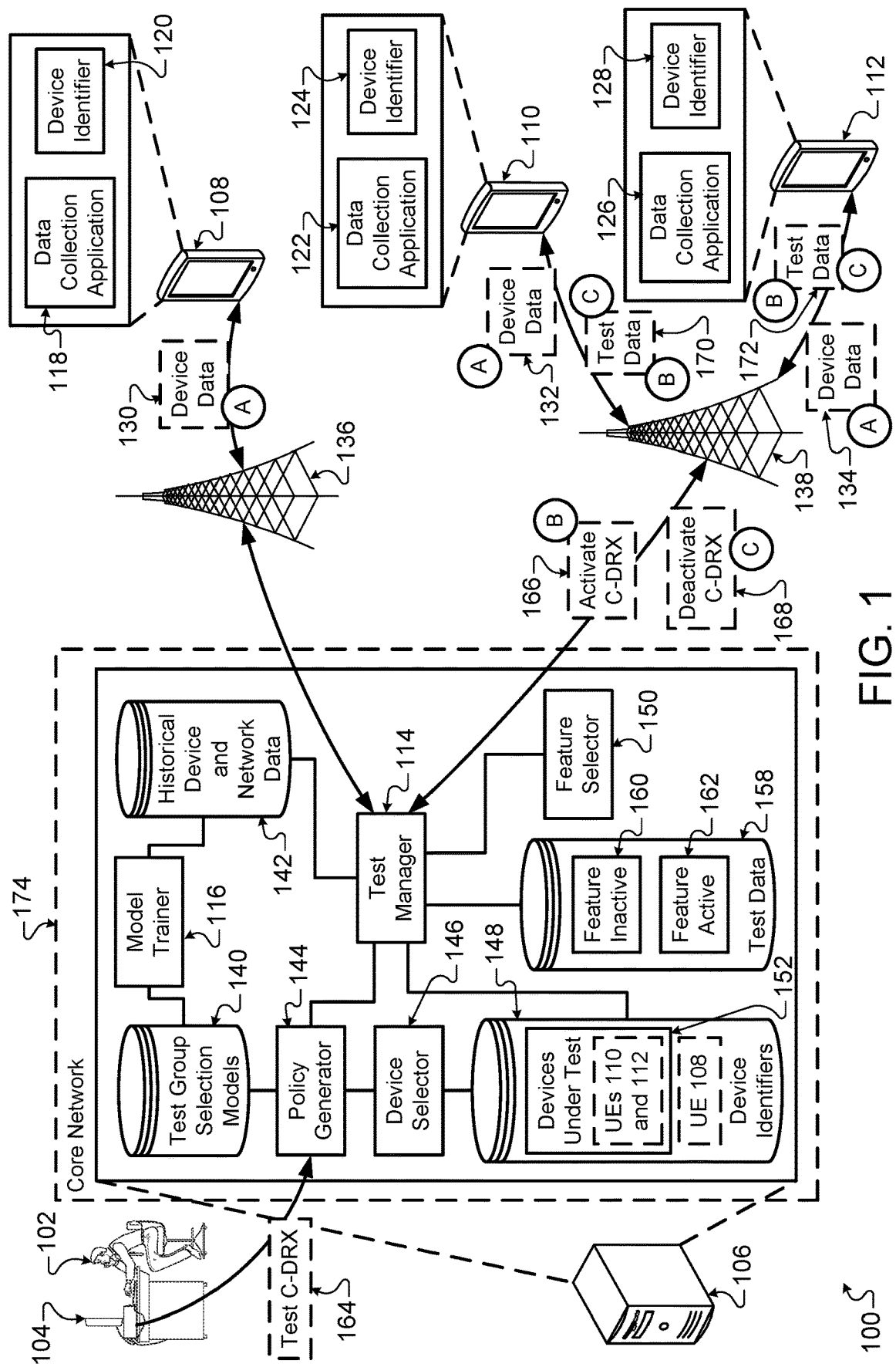
FIG. 1 illustrates an example system that is configured to test a network feature, in accordance with at least one embodiment.

Testing a new feature of a wireless carrier network before deploying the new feature can be of critical importance to ensure that the new feature does not cause any problems with the end users and their devices. Testing can sometimes be performed in a lab using a small cell site and several user devices. Other types of testing may involve deploying the new feature to one of several predetermined locations and monitoring the network and the user devices in the predetermined locations. Both of these techniques are limited in the breadth of cell sites and user devices that can be tested. Testing in a lab may be limited to a few devices in a controlled environment. Testing at predetermined locations may, unintentionally, introduce bias in the data, for example, because users at the predetermined locations may utilize the network differently than other users throughout the coverage area of the wireless carrier network.

To effectively test a new feature of a wireless carrier network, it may be helpful to expand the testing field to include the entire coverage area of the network. However, blindly adding additional user devices and cell sites may not yield useful results because data collected during the test may be affected by other differences in the user devices and cell sites that are unrelated to the new feature. In order to isolate the new feature, it is useful to first monitor the habits, actions, and/or characteristics of users and/or their devices. Based on the collected data related to these habits, actions, and/or characteristics, the testing system may train a model that is configured to predict what actions a user will likely perform on the user device, when the user will likely perform this action, and/or what the likely settings or characteristics of the user device will be. With this model the system may be able to select a group of users who fit specific criteria that complements a testing environment for the new feature. For example, if the system is attempting to test the impact that the new feature has on battery life, then the model may be able to identify a group of user devices that have applications installed that each have similar impacts on battery life and corresponding users that are performing similar actions that each have similar impacts on battery life.

With the group of user devices selected using the model, the system clusters those groups of user devices based on where the user devices connect to the network, when the user devices are performing the similar actions, the type of user device, and other characteristics. With these clusters identified, the system deploys the new feature to cell sites so that the new feature will affect one or more of the clusters. Because these users and user devices follow a predictable pattern, the system can collect network and user data from the cluster both when the new feature is deployed and the next time the users and user devices are performing the same actions in the same location. With these two sets of test data, the system is able to isolate the new feature and accurately determine how the new feature affects the users better than testing the new feature in a lab or in a predetermined location.

FIG. 1 illustrates an example system 100 that is configured to test a network feature. Briefly, and as described in more detail below, the system 100 includes a server 106 that is configured to communicate with computing devices 108, 110, and 112 through a wireless carrier network that includes base stations 136 and 138. The server 106 collects data from one or more of the computing devices 108, 110, and 112. The server 106 adjusts a characteristic of the wireless carrier network and collects additional data from the same computing devices. The server 106 may analyze the data to determine what effect the adjusted characteristic has on the experience of users of the computing devices 108, 110, and 112.

The server 106 may select the one or more of the computing devices 108, 110, and 112 based on analyzing usage patterns of the computing devices that communicate over the wireless carrier network. The server 106 may determine that the activities of the users of the selected computing devices may be similar and that the selected computing devices are connected to the same base station. With the computing devices selected, the server 106 may collect data from the selected computing devices with and without the characteristic adjusted. This helps to isolate the adjusted characteristic and attributes any changes in the experience of the users of the selected computing devices to the adjusted characteristic. With this information, an operator of the wireless carrier network can determine whether to adjust the characteristic for each of the base stations of the wireless carrier network.

In more detail, the user 102 is testing the effect that adjusting a characteristic of the wireless carrier network has on the computing devices 108, 110, and 112 and other computing devices that communicate over the wireless carrier network. For example, the user 102 may be testing the effect that deploying C-DRX (connected mode discontinuous reception) may have on the battery life of the computing devices 108, 110, 112 and other computing devices. The user 102 may use computing device 104 to transmit a test request 164 to the server 106. The test request 164 may indicate to test the effect that C-DRX has on the battery life of the computing devices communicating over the wireless access network.

The server 106 may include a test manager 114 that is configured to perform the test that the user 102 requested. The test manager 114 may adjust characteristics of the base stations 136 and 138 and receive test data from the selected computing devices. The server 106 may be included in or in communication with a network such as a wireless carrier network that provides voice and data communication services to multiple devices, such as the computing devices 108, 110, 112, and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 106 may communicate with the computing devices 108, 110, 112, and other devices using a Wi-Fi network, short range radio, infrared communication, and/or any other similar communication technique.

The wireless carrier network may include a radio access network and a core network 174. The radio access network may include multiple base stations, such as base stations 136 and 138. The multiple base stations are responsible for handling voice and/or data traffic between multiple devices, such as the computing devices 108, 110, 112, and other devices and the core network 174. Accordingly, each of the base stations 136 and 138 may provide a corresponding network cell that delivers telecommunication and data communication coverage. The core network 174 may use the network cells to provide communication services to the multiple subscriber devices. For example, the core network 174 may connect the multiple devices to other telecommunication and data communication networks, such as the Internet and the public switched telephone network (PSTN). The base stations 136 and 138 are responsible for handling voice and data traffic between devices and the core network 174. In some implementations, the base stations 136 and 138 may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send RF signals to devices and receive radio signals from devices.

In order to select the computing devices for the test, the server 106 may collect device data 130, 132, and 134 from the computing devices 108, 110, and 112. The device data 130, 132, and 134 may include network connectivity information, radio state, location, user's usage with the computing device and applications, battery status, device and application crashes, and/or other similar diagnostic metrics. The computing devices 108, 110, and 112 may each include a data collection application 118, 122, and 126 that are configured to collect the device data and transmit the device data to the server 106.

The computing devices 108, 110, and 112 may each include a device identifier 120, 124, and 128. The device identifier 120, 124, and 128 may be a unique identifier for each of the computing devices 108, 110, and 112. The data collection applications 118, 122, and 126 may include the device identifier 120, 124, and 128 in the device data 130, 132, and 134 provided to the server 106. In some implementations, a user of the computing device 108, 110, or 112 may be able to configure the data collection application 118, 122, or 126 to sharing none, some, or all of the data that the data collection application 118, 122, or 126 is configured to collect. In some implementations, the user may have the option of anonymizing the device data 130, 132, or 134 so that the device identifier 120, 124, or 128 is not included in the device data 130, 132, or 134.

The data collection applications 118, 122, and 126 may be configured to provide data in response to a request from the server 106. In some implementations, the data collection applications 118, 122, and 126 may collect and transmit data at periodic intervals, such as every minute. In some implementations, the data collection applications 118, 122, and 126 may be configured to collect data at periodic intervals and transmit the device data 130, 132, or 134 at less frequent intervals and/or when the computing device 108, 110, or 112 is charging and/or connected to a Wi-Fi network.

The test manager 114 of the server 106 may receive the device data 130, 132, and 134. If the computing device 108, 110, or 112 is transmitting data over the wireless carrier network, then the server 106 may receive the device data 130, 132, and 134 from the base stations 136 and 138. If the computing device 108, 110, or 112 is transmitting data over the internet, then the server 106 may receive the device data 130, 132, and 134 from the internet. The test manager 114 may store the device data 130, 132, and 134 in the historical device and network data 142.

The server 106 may generate diagnostic network data similar to the device data 130, 132, and 143. The server 106 may store the network data in the historical device and network data 142. Each sample of the device data 130, 132, and 134 may include corresponding network data. The network data may be associated with a specific computing device 108, 110, or 112 using the device identifiers 120, 124, and 128. The network data may include network side radio access network coverage, radio band frequency used by the base stations 136 and 138, bandwidth of each base station 136 and 138, and any other similar network data. In some instances, the server 106 may collect the network data at approximately the same time that the corresponding computing device 108, 110, or 112 collect the device data 130, 132, and 143.

The server 106 may include a model trainer 116. The model trainer 116 may be configured to analyze the historical device and network data 142 and generate the test group selection models 140. The model trainer 116 can use supervised learning techniques such as support vector machine and/or random forest to identify user behavior patterns in the historical device and network data 142 for a given context. The context may include the day, time, the location of the computing device, the network connectivity of the computing device, and/or any other similar context information.

The server 106 may use the test group selection models 140 to predict what actions the computing device 108, 110, or 112 are likely to be performing at a given day and time. For example, the server 106 may provide a day of Thursday and a time of 6 pm to the test group selection models 140. The test group selection models 140 may output data indicating that the computing device 108 will likely be streaming video at the home of the user of the computing device 108, the computing device 110 will likely be displaying social media content at the home of the user of the computing device 110, and the computing device 112 will likely be streaming music while moving in a vehicle. These example actions may be related to applications that are running in the foreground of the computing devices 108, 110, and 112. In some implementations, the test group selection models 140 may also predict what applications or other actions the computing devices 108, 110, and 112 may be running or performing. For example, test group selection models 140 may indicate that an email application of the computing device 112 will likely be checking the server for new messages every second.

The server 106 may include a policy generator 144 that is configured to determine the characteristics of the computing devices selected to be included in the test. The policy generator 144 may receive a test request 164 from the computing device 104. The user 102 may provide instructions to the computing device 104 to test a feature or characteristic of the wireless carrier network. For example, the user 102 may request that the server 106 test the C-DRX feature of the wireless carrier network. In some implementations, the user 102 may indicate whether the test process should focus on any particular aspect of the user experience. For example, the user 102 may indicate to determine the impact that the C-DRX feature has on battery life, on download speeds, on upload speeds, and/or any other similar parameter related to the user experience The policy generator 144 may generate a policy to select the computing devices for the test specified in the test request 164. The policy generator 144 may determine the filtering parameters of the policy that are used to select the group of computing devices and corresponding users that will participate in the test. In some implementations, the policy generator 144 may compare the test request 164 to previous test requests and corresponding policies. If the test request 164 is similar to a previous test request, then the policy generator 144 may select the policy corresponding to that test request. In some implementations, the policy generator 144 may determine that two or more previous test requests are similar to the test request 164. In this case, the policy generator 144 combine the corresponding policies to generate a new policy that includes filtering parameters from each of the corresponding policies.

In some implementations, the policy generator 144 may receive a policy from a user. In this case, the user may receive the test request 164 and determine the filtering parameters of a policy to select the group of computing devices for the test. The policy generator 144 may use the manually determines policies to automatically generate policies for subsequently received test requests. As an example, the test request 164 may indicate to test how C-DRX affect the battery life of a computing device. In this case, the policy generator 144 may generate a policy that specifies to select computing devices that do not include an application that uses more than a threshold amount of battery power while active. The policy may also indicate to select the computing devices that will likely have the remaining battery power in a particular range, such as between fifty and eighty percent. The policy may also indicate to select the computing devices that will likely have real-time power usage within a particular range, such as between 0.1 and 0.2 watts.

The policy generator 144 may provide the policy to the device selector 146. The device selector 146 may be configured to use the test group selection models 140 and the policy from the policy generator 144 to select the computing devices for the test. The device selector 146 identifies the computing devices that comply with the filtering parameters in the policy. The device selector 146 may cluster those identified computing devices into different groups. The device selector 146 may cluster the identified computing devices according to location, time, network connectivity, application in the foreground, applications in the background, power usage, and/or any other similar characteristic.

The device selector 146 may store data identifying the clusters in the device identifiers 148. The device identifiers 148 may store the device identifiers for each of the computing devices that communicate with the server 106 through the wireless carrier network. For example, the device identifiers 148 may store the device identifiers 120, 124, and 128 of computing devices 108, 110, and 112. The device selector 146 may indicate the computing devices that complied with the filtering parameters in the policy by including the device identifiers for those computing devices in the devices under test 152 portion of the device identifiers 148.

The device selector 146 may adjust the devices under test 152 to a different cluster after the test manager 114 has performed the test. For example, the device selector 146 may identify a first cluster of computing devices and flag those computing devices as the devices under test 152. The test manager 114 may perform a first test. After the first test, the device selector 146 may identify a second cluster of computing devices and flag those computing devices as the devices under test 152.

For example, the device selector 146 identifies the computing devices that comply with the filtering parameters in the policy. The filtering parameters may specify to identify those devices that are likely streaming video during a particular time period, such as every Sunday evening. The device selector 146 may cluster the identified computing devices based on the location that each identified computing device will likely be during the particular time period. The device selector 146 may identify four clusters, where each cluster is likely communicating with a different base station during the particular time period. The device selector 146 may update the devices under test 152 to indicate each cluster during each passing of the particular time period.

In some implementations, the device selector 146 may identify the computing devices that are likely streaming video during various time periods. For example, the device selector 146 may identify a first group of computing devices that are likely streaming video during Monday evening, a second group of computing devices that are likely streaming video during Tuesday evening, and a third group of computing devices that are likely streaming video during Wednesday morning. The device selector 146 may cluster each group of computing devices according to location. The device selector 146 may identify a first cluster from the first group based on the first cluster likely communicating with a first base station during Monday evening, a second cluster from the first group based on the second cluster likely communicating with a second base station during Monday evening, and a third cluster from the first group based on the third cluster likely communicating with a third base station during Monday evening. The device selector 146 may identify additional clusters from the second and third groups of computing devices. The device selector 146 may update the devices under test 152 to indicate each cluster during each passing of the various time periods.

The server 106 may include a feature selector 150 that is configured to manage the changing of the feature that is being tested as specified in the test request 164. The feature selector 150 may receive the filtering parameters of the policy specified by the policy generator and receive, from the device selector 146, data indicating that the devices under test 152 have been updated. The feature selector 150 may request that a characteristics of the base station 136 or 138 change depending on the devices under test 152 and the test request 164. For example, the feature selector 150 may determine to activate the C-DRX feature of base station 138 based on the test request 164 and the device selector 146 indicating that the computing devices 110 and computing devices 112 are likely communicating with the base station 138 and are the devices under test 152. Based on the timing of the device selector 146 updating the devices under test 152, the feature selector 150 may determine to deactivate the C-DRX feature of base station 138.

During or after the test manager 114 performs a test, the test manager 114 may collect test data 170 and 172 from the computing devices under test 152 (e.g., computing devices 110 and 112) and/or the base stations (e.g., base station 138) that the computing devices under test are communicating with. The test data 170 and 172 may include network connectivity information, radio state, location, user's usage with the computing device and applications, battery status, device and application crashes, network side radio access network coverage, radio band frequency used by the base station 138, bandwidth of the base station 138, and any other similar diagnostic network or device data.

The test manager 114 may store the test data 170 and 172 in the test data storage 158. The test data storage 158 may include feature-active test data 162 and the feature-inactive test data 160. The test manager 114 may store the test data 170 and 172 collected while the feature selector 150 indicated that the feature was active in the feature-active test data 162. The test manager 114 may store the test data 170 and 172 collected while the feature selector 150 indicated that the feature was inactive in the feature-inactive test data 160.

The feature-active test data 162 and the feature-inactive test data 160 may include data that isolates the feature specified in the test request 164. For example, if the test request 164 indicates to test C-DRX, then the feature-active test data 162 and the feature-inactive test data 160 may illustrate how C-DRX affects the performance of the computing devices 110 and 112 and the user experience. The test manager 114 may analyze the feature-active test data 162 and the feature-inactive test data 160 to determine whether to deploy C-DRX to the base stations 136 and 138. For example, if C-DRX cause battery depletion Stages A-D in FIG. 1 illustrate an example flow of data between the server 106 and the computing devices 108, 110, and 112. While the example of FIG. 1 shows the data flow and processing in the order of A then B then C then D, the order of the stages may be rearranged. In stage A, the data collection applications 118, 122, and 126 collect and transmit device data 130, 132, and 134 from computing devices 108, 110, and 112. The device data 130, 132, and 134 may include the device identifier 120, 124, and 128, respectively.

The test manager 114 of the server 106 may receive the device data 130, 132, and 134. The test manager 114 may store the device data 130, 132, and 134 in the historical device and network data 142. The server 106 may collect network data while the data collection applications 118, 122, and 126 collect the device data 130, 132, and 134. The server 106 may store the network data and associate the respective device identifier 120, 124, or 128 with the network data.

The model trainer 116 may generate a model using the historical device and network data 142. The model may be configured to predict the actions of a user of the computing devices 108, 110, and 112 at future times. The model trainer 116 may store the model in the test group selection models 140. The user 102 may submit a test request 164 through computing device 104. The test request 164 may specify to test what effects C-DRX has on the performance of the computing devices communicating with the server 106 through the base stations 136 and 138 and on the user experience.

The policy generator 144 of the server 106 may receive the test request 164 and determine a policy based on the test request 164. The policy generator 144 may determine that computing devices that use between one hundred and one hundred fifty milliwatts for a fifteen-minute period should be included in the test group. The policy generator 144 may provide the policy to the device selector 146. The device selector 146 may use the model in the test group selection models 140 to identify the devices that comply with the policy. The device selector 146 may identify various groups of devices that comply with the policy at different time periods. In this example, the device selector 146 may identify computing devices 110 and 112 as complying with the policy. Computing device 108 may not comply with the policy.

The test manager 114 may receive data from the device selector 146 that indicates when the computing devices 110 and 112 comply with the policy. For example, the device selector 146 may indicate that computing devices 110 and 112 comply with the policy on Tuesdays between 6 pm and 7 pm. The test manager 114 may instruct the feature selector 150 to activate the C-DRX feature between 6 pm and 7 pm on the first Tuesday. The test manager 114 may instruct the feature selector 150 to ensure that the C-DRX feature is deactivated between 6 pm and 7 pm on the second Tuesday. The device selector 146 may update the device identifiers 148 by indicating that the devices under test 152 include computing devices 110 and 112 between 6 pm and 7 pm on the first Tuesday. The device selector 146 may also ensure that the devices under test 152 include computing devices 110 and 112 between 6 pm and 7 pm on the second Tuesday. If the test manager 114 performed any tests between the first and second Tuesday, then the devices under test 152 may need updating.

In stage B, between 6 pm and 7 pm on the first Tuesday, the feature selector 150 activates the C-DRX feature for base station 138. The test manager 114 receives test data 170 from the computing device 110 and test data 172 from the computing device 112. The test manager 114 may store the test data 170 and 172 in the feature active section 162 of the test data 158. The server 106 may also collect network data related to the base station 138 and the computing devices 110 and 112 and store the network data in the feature active section 162 of the test data 158.

In stage C, between 6 pm and 7 pm on the second Tuesday, the feature selector 150 ensures that that C-DRX feature for the base station 138 is not active. The test manager 114 receives additional test data 170 from the computing device 110 and additional test data 172 from the computing device 112. The test manager 114 may store the additional test data 170 and 172 in the feature inactive section 160 of the test data 158. The server 106 may also collect additional network data related to the base station 138 and the computing devices 110 and 112 and store the additional network data in the feature inactive section 160 of the test data 158.

The server 106 may compare the feature inactive data 160 to the feature active data 162 to determine the effect of C-DRX on the wireless carrier network, the computing devices connected to the wireless carrier network, and the users. For example, the server 106 may determine that C-DRX does not cause computing devices to use more than ten milliwatts of batter power, while improving the speed at which computing devices receive and transmit data over the wireless carrier network. Based on that determination, the server 106 may determine to activate C-DRX for the base stations 136 and 138 and other base stations.

Figure 2:
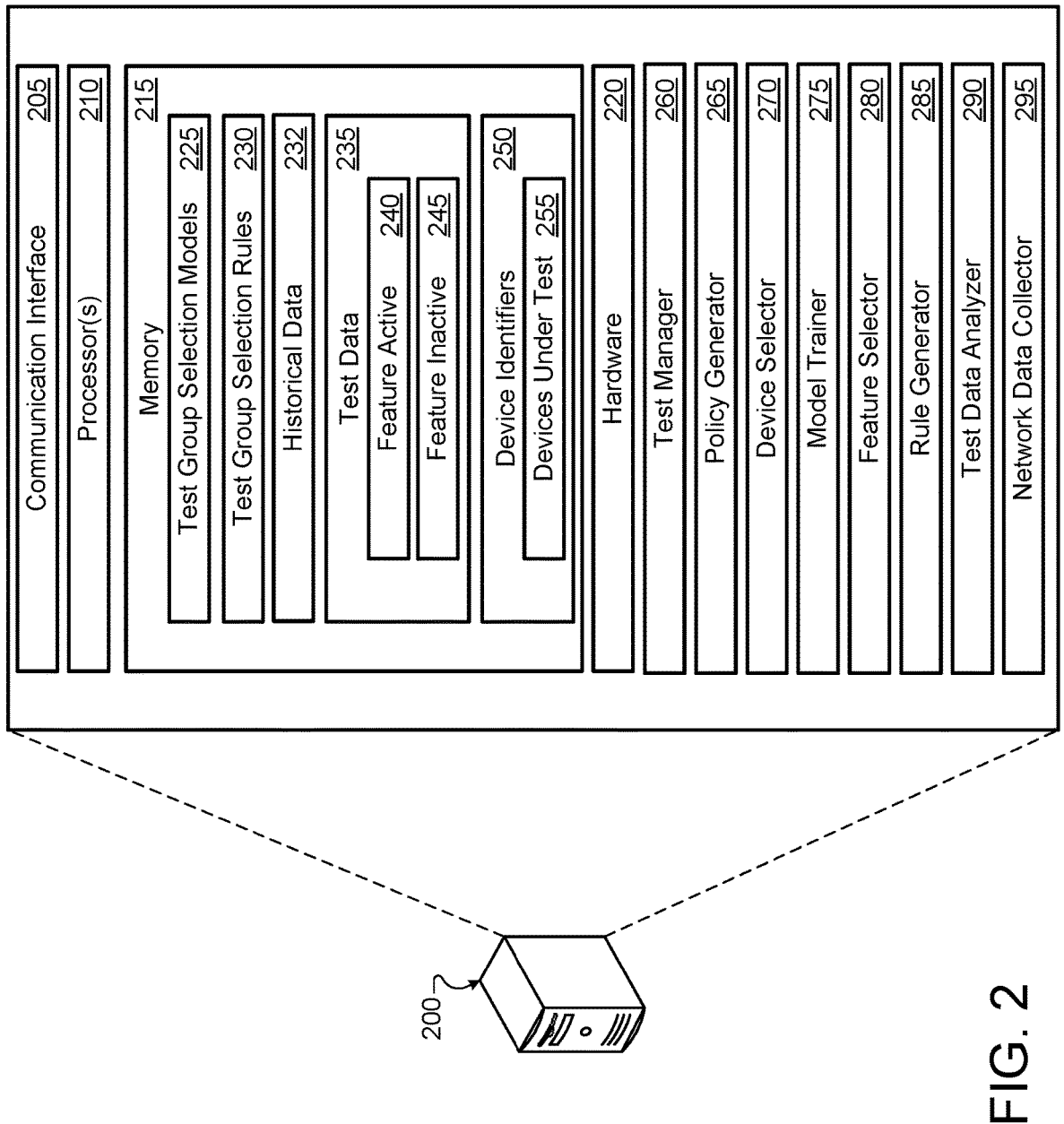
FIG. 2. illustrates an example server that is configured to test a network feature, in accordance with at least one embodiment.

FIG. 2. illustrates an example server 200 that is configured to test a network feature. The server 200 may be any type of computing device that is configured to communicate with other computing devices. The server 200 may be integrated into a wireless carrier network or interact with a wireless carrier network. The server 200 may communicate with other computing devices using a wide area network, a local area network, the internet, a wired connection, a wireless connection, and/or any other type of network or connection. The wireless connections may include Wi-Fi, short-range radio, infrared, and/or any other similar wireless connection. The server 200 may be similar to the server 106 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate using over a wide area network, a local area network, the internet, a wired connection, a wireless connection, and/or any other type of network or connection. The wireless connections may include Wi-Fi, short-range radio, infrared, and/or any other similar wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a test manager 260. The test manager 260 may be similar to the test manager 114 of FIG. 1. The test manager 260 may be configured to perform a test in response to the server 200 receiving a test request. The test request may specify to adjust and/or add a feature to the wireless carrier work. For example, the test request may specify to test what effect C-DRX has on the user experience and the battery life of the computing devices communicating with the server 200 over the wireless carrier network. The test manager 114 may communicate with the communication interface 205 to transmit and receive commands to the components of the wireless carrier network such as base stations. The test manager 114 may communicate with the communication interface 205 to receive test data from various computing devices communicating over the wireless carrier network.

The test manager 260 may be configured to manage a test specified by a test request by ensuring that the feature of wireless carrier network is adjusted and/or added at the correct time and to the correct component of the wireless carrier network. The test manager 260 may communicate with various components of the server 200 to ensure that test data is collected from the correct devices and stored in the correct location. The test manager 260 may manage the test by implementing a policy that specifies the characteristics of devices for the test, the locations of the devices, and the times that those devices exhibit the characteristics of the policy.

The one or more processors 210 may implement a model trainer 275. The model trainer 275 may be similar to the model trainer 116 of FIG. 1. The model trainer 275 may be configured to analyze the historical data 232 and generate the test group selection models 225. The model trainer 275 can use supervised learning techniques such as support vector machine and/or random forest to identify user behavior patterns in the historical data 232 for a given context. The context may include the day, time, the location of the computing device, the network connectivity of the computing device, and/or any other similar context information.

The historical data 232 may store data similar to the data stored by the historical device and network data 142 of FIG. 1. The server 200 may receive data from various computing devices that communicate with the wireless carrier network. The device data may include network connectivity information, radio state, location, user's usage with the computing device and applications, battery status, device and application crashes, and/or other similar diagnostic metrics. The server 200 may store this data in the historical data 232. In some implementations, the historical data 232 may be anonymized. In some implementations, the historical data 232 may include device identifiers that relates to the device data received from each of the computing devices to a respective computing device.

The historical data 232 may also receive network data from the network data collector 295. The one or more processors 210 may implement the network data collector 295. The network data collector 295 may collect network data based on the server 200 receiving device data from a computing device. The network data may include network side radio access network coverage, radio band frequency used by the base stations, bandwidth of each base station, and/or any other similar network data. In some implementations, the network data collector 295 may coordinate with the computing devices so that the network data collector 295 collects the network data at approximately the same time that the computing devices collect the device data. For example, the network data collector 295 and the computing devices may collect data at the same five-minute intervals. In some implementations, the network data may include device identifiers that relates to the network data to a respective computing device.

The one or more processors 210 may implement a rule generator 285. The rule generator 285 may be configured to analyze the historical data 232 and generate rules that specify which devices will exhibit similar characteristics during various times. The rule generator 285 may store the rules in the test group selection rules 230. The rule generator 285 may be configured to identify, in the historical data 232, usage patterns of computing devices communicating with the wireless carrier network. Based on those patterns, the rule generator 285 may generate a rule that specifies what devices may exhibit certain characteristics during a particular time period. For example, the rule generator 285 may identify a pattern that certain computing devices stream audio during the time of 7 am to 8 am on Monday through Friday. The rule generator 285 may generate a rule 285 that specifies to select those computing devices during 7 am to 8 am on Monday through Friday if the specified characteristic of a device is streaming audio.

The one or more processors 210 may implement a policy generator 265. The policy generator 265 may be similar to the policy generator 144 of FIG. 1. The policy generator 265 may be configured to determine what characteristics the computing devices selected to the included in the test may exhibit. The policy generator 265 may receive a test request from a computing device. The test request may provide instructions to test a feature or characteristic of the wireless carrier network. For example, test request that the server 200 test the C-DRX feature of the wireless carrier network. In some implementations, the test request may indicate whether the test should focus on any particular aspect of the user experience. For example, the test request may indicate to determine the impact that the C-DRX feature has on battery life, download speeds, upload speeds, and/or any other similar parameter related to the user experience.

The policy generator 265 may generate a policy to select the computing devices for the test specified in the test request. The policy generator 265 may determine the filtering parameters of the policy that are used to select the group of computing devices and corresponding users that will participate in the test. In some implementations, the policy generator 265 may compare the test request to previous test requests and corresponding policies. If the test request is similar to a previous test request, then the policy generator 265 may select the policy corresponding to that test request. In some implementations, the policy generator 265 may determine that two or more previous test requests are similar to the test request. In this case, the policy generator 265 combines the corresponding policies to generate a new policy that includes filtering parameters from each of the corresponding policies.

In some implementations, the policy generator 265 may receive a policy from a user. In this case, the user may receive the test request and determine the filtering parameters of a policy to select the group of computing devices for the test. The policy generator 265 may use the manually determined policies to automatically generate policies for subsequently received test requests. As an example, the test request may indicate to test how C-DRX affect the battery life of a computing device. In this case, the policy generator 265 may generate a policy that specifies to select computing devices that do not include an application that uses more than a threshold amount of battery power while active. The policy may also indicate to select the computing devices that will likely have the remaining battery power in a particular range, such as between fifty and eighty percent. The policy may also indicate to select the computing devices that will likely have real-time power usage within a particular range, such as between 0.1 and 0.2 watts.

The one or more processors 210 may implement a device selector 270. The device selector 270 may be similar to the device selector 146 of FIG. 1. The device selector 270 may receive a policy from the policy generator 265. The device selector 270 may be configured to use the test group selection models 225 and/or the test group selection rules 230 and the policy from the policy generator 265 to select the computing devices for the test. The device selector 270 identifies the computing devices that comply with the filtering parameters in the policy. The device selector 270 may cluster those identified computing devices into different groups. The device selector 270 may cluster the identified computing devices according to location, time, network connectivity, application in the foreground, applications in the background, power usage, and/or any other similar characteristic.

The device selector 270 may store data identifying the clusters in the device identifiers 250. The device identifiers 250 may store the device identifiers for each of the computing devices that communicate with the server 200 through the wireless carrier network. The device selector 270 may indicate the computing devices that complied with the filtering parameters in the policy by including the device identifiers for those computing devices in the devices under test 255 portion of the device identifiers 250.

The test manager 260 may instruct the device selector 270 to adjust the devices under test 255 to a different cluster after the test manager 260 has performed the test. For example, the test manager 260 may instruct the device selector 270 to identify a first cluster of computing devices and flag those computing devices as the devices under test 255. The test manager 260 may perform a first test. After the first test, the test manager 260 may instruct the device selector 146 to identify a second cluster of computing devices and flag those computing devices as the devices under test 255.

For example, the device selector 270 identifies the computing devices that comply with the filtering parameters in the policy. The filtering parameters may specify to identify those devices that are likely streaming video during a particular time period, such as every Sunday evening. The device selector 270 may cluster the identified computing devices based on the location that each identified computing device will likely be during the particular time period. The device selector 270 may identify four clusters, where each cluster is likely communicating with a different base station during the particular time period. The device selector 270 may update the devices under test 255 to indicate each cluster during each passing of the particular time period or in response to an instruction from the test manager 260.

In some implementations, the device selector 270 may identify the computing devices that are likely streaming video during various time periods. For example, the device selector 270 may identify a first group of computing devices that are likely streaming video during Monday evening, a second group of computing devices that are likely streaming video during Tuesday evening, and a third group of computing devices that are likely streaming video during Wednesday morning. The device selector 270 may cluster each group of computing devices according to location. The device selector 270 may identify a first cluster from the first group based on the first cluster likely communicating with a first base station during Monday evening, a second cluster from the first group based on the second cluster likely communicating with a second base station during Monday evening, and a third cluster from the first group based on the third cluster likely communicating with a third base station during Monday evening. The device selector 270 may identify additional clusters from the second and third groups of computing devices. In response to an instruction from the test manager 260, the device selector 270 may update the devices under test 255 to indicate each cluster during each passing of the various time periods.

The one or more processors 210 may implement a feature selector 280. The feature selector 280 may be similar to the feature selector 150 of FIG. 1. The feature selector 280 may be configured to manage the changing of the feature that is being tested as specified in the test request. The feature selector 280 may receive the filtering parameters of the policy specified by the policy generator 265 and receive, from the device selector 270, data indicating that the devices under test 255 have been updated. In some implementations, the feature selector 280 may change the feature being tested in response to a request from the test manager 260. The feature selector 280 may request that a characteristics of a base station change depending on the devices under test 255 and the test request, or in response to a request from the test manager 260. For example, the feature selector 280 may determine to activate the C-DRX feature of a base station based on the test request and the device selector 270 indicating that the computing devices are likely communicating with the base station and are the devices under test 255. Based on the timing of the device selector 270 updating the devices under test 255, the feature selector 280 may determine to deactivate the C-DRX feature of base station. As another example, the feature selector 280 may activate or deactivate the C-DRX feature of a base station in response to an instruction from the test manager 260.

During the test, the test manager 260 may, through the communication interface 205, receive test data from the computing devices identified in the devices under test 255. The test data may be similar to the device data received by the computing devices. The test manager 260 may transmit instructions to the computing devices identified in the devices under test 255 and request that computing devices transmit test data during the time period specified by the test manager 260. In some implementations, the computing devices may continuously transmit the device data, which may be test data during the time when the test manager 260 is conducting a test.

Depending on whether the feature is active or inactive, the test manager 260 may store the test data in the feature active portion of the test data 240 or the feature inactive portion of the test data 245. The test manager 260 may also request that the network data collector 295 collect and store network data during the test. The test manager 260 may instruct the network data collector 295 to store the network data in the feature active portion of the test data 240 when the feature is active or in the feature inactive portion of the test data 245 when the feature is inactive.

When the test manger 260 concludes the test, the test manager 260 may instruct the test data analyzer 290 to compare the feature active portion of the test data 240 to the feature inactive portion of the test data 245. The test data analyzer 290 may determine what effect the feature has on the performance of the computing devices, the user experience, and/or any other similar metric. The test data analyzer 290 may determine whether to implement the feature as part of the wireless carrier network or to bypass implementing the feature as part of the wireless carrier network.

Figure 3:
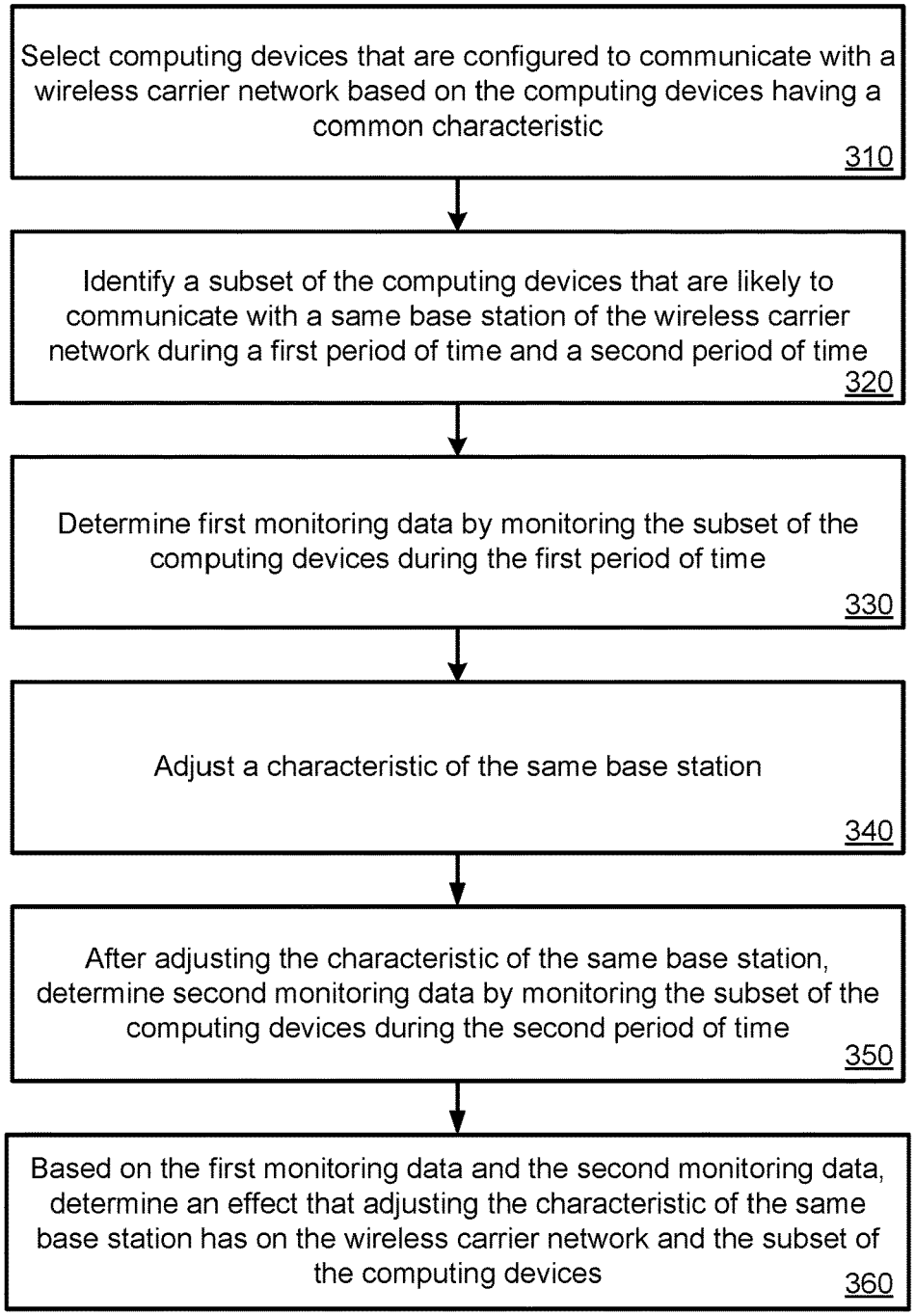
FIG. 3 is a flowchart of an example process for testing a network feature, in accordance with at least one embodiment.

FIG. 3 is a flowchart of an example process 300 for testing a network feature. In general, the process 300 identifies computing devices that have common device and/or network characteristics during the same time that occurs periodically. During at least two instances of that time, the process 300 may adjust the network feature. Based on data collected during those two instances, the process 300 may determine what affect the network feature has on the computing devices and/or the network. The process 300 will be described as being performed by the server 106 of FIG. 1 and will include references to other components in FIG. 1. The process 300 may also be performed by the server 200 of FIG. 2.

The server 106 selects computing devices that are configured to communicate with a wireless carrier network based on the computing devices having a common characteristic (310). The computing devices that have the common characteristic may be computing devices that are likely to perform a similar action at the same time. For example, the selected computing devices may be more likely to stream video at 7 pm on Wednesdays. In some implementations, the server 106 receives a request 164 to determine the effect that adjusting a characteristic of the wireless carrier network has on the performance of the computing device, the user experience, and/or any other similar metric. The server 106 identifies a common characteristic for computing devices to have to test adjusting the characteristic of the wireless carrier network based on the request 164.

In some implementations, the server 106 uses a model that is configured to receive the common characteristic and output data identifying the computing devices that have the common characteristic. The model may output the day and time that the computing devices have the common characteristic. In some implementations, the server 106 trains the model using machine learning and historical data that indicates the past actions performed by the computing devices that communicated with the server 106.

The server 106 identifies a subset of the computing devices that are likely to communicate with a same base station of the wireless carrier network during a first period of time and a second period of time (320). The server 106 clusters the selected computing devices according to location, time, and/or any other similar characteristic. The server 106 may cluster the computing devices into various subsets, where each subset has the common characteristic at the same time, while at a similar location, and/or any other similar point. For example, the server 106 may cluster the computing devices into subsets that are likely to stream video during hour long intervals while communicating with the same base station. The server 106 may select a subset, perform the remaining portion of the process 300, and repeat the remaining portion of the process 300 again with a different subset.

The server 106 determines first monitoring data by monitoring the subset of the computing devices during the first period of time (330). In some implementations, the first monitoring data includes first communications parameters that reflect first characteristics of first communications between the subset of the computing devices and the same base station. In some implementations, the server 106 receives, from the subset, first device data that reflects first characteristics of the subset of the computing devices. The server 106 determines first network data that reflects second characteristics of the wireless carrier network.

The server 106 adjusts a characteristic of the same base station (340). In some implementations, the server 106 adjusts a technique that the same base station uses to communicate with the subset of the computing devices. The server 106 may determine the characteristic to adjust based on the test request 164.

After adjusting the characteristic of the same base station, the server 106 determines second monitoring data by monitoring the subset of the computing devices during the second period of time (350). In some implementations, the second monitoring data includes second communications parameters that reflect second characteristics of second communications between the subset of the computing devices and the same base station. In some implementations, the server 106 receives, from the subset, second device data that reflects the first characteristics of the subset of the computing devices. The server 106 determines second network data that reflects the second characteristics of the wireless carrier network.

Based on the first monitoring data and the second monitoring data, the server 106 determines an effect that adjusting the characteristic of the same base station has on the wireless carrier network and the subset of the computing devices (360). The server 106 may compare the first monitoring data to the second monitoring data to determine the effect that adjusting the characteristic has on the wireless carrier network. Based on the effect, the server 106 may determine to maintain the adjusted characteristic for all or the majority of the base stations of the wireless carrier network. The server may determine to bypass maintaining the adjusted characteristic for all or the majority of the base stations of the wireless carrier network in cases where the computing devices experienced a decrease in performance.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
    identifying computing devices that are likely to communicate with a same base station of a wireless carrier network;
    determining first monitoring data by monitoring the computing devices;
    adjusting a characteristic of the same base station;
    after adjusting the characteristic of the same base station, determining second monitoring data by monitoring the computing devices; and
    based on the first monitoring data and the second monitoring data, determining an effect that adjusting the characteristic of the same base station has on the wireless carrier network.

2. The method of claim 1, wherein identifying the computing devices that are likely to communicate with the same base station comprises:
    identifying the computing devices that are likely to perform a similar action at a same time.

3. The method of claim 1, wherein:
    the first monitoring data includes first communications parameters that reflect first characteristics of first communications between the computing devices and the same base station, and
    the second monitoring data includes second communications parameters that reflect second characteristics of second communications between the computing devices and the same base station.

4. The method of claim 1, wherein adjusting a characteristic of the same base station comprises:
    adjusting a technique that the same base station uses to communicate with the computing devices.

5. The method of claim 1, comprising:
    training, using machine learning and historical data, a model that is configured to receive a given characteristic and output data identifying given computing devices,
    wherein identifying the computing devices that are likely to communicate with the same base station comprises providing data identifying a common characteristic as an input to the model and receiving, from the model, data identifying the computing devices.

6. The method of claim 1, comprising:
    based on the effect that adjusting the characteristic of the same base station has on the wireless carrier network and the computing devices, adjusting the characteristic of the same base station and other base stations of the wireless carrier network.

7. The method of claim 1, comprising:
    receiving a request to determine the effect that adjusting the characteristic has on the wireless carrier network; and
    based on the request to determine the effect that adjusting the characteristic has on the wireless carrier network, determine the common characteristic.

8. The method of claim 1, wherein:
    determining the first monitoring data by monitoring the computing devices comprises:
        receiving, from the computing devices, first device data that reflects first characteristics of the computing devices; and
        determining first network data that reflects second characteristics of the wireless carrier network, and
    determining the second monitoring data by monitoring the computing devices comprises:
        receiving, from the computing devices, second device data that reflects the first characteristics of the computing devices; and
        determining second network data that reflects the second characteristics of the wireless carrier network.

9. A system, comprising:
    one or more processors; and
    memory including a plurality of computer-executable components that are executable by the one or more processors to perform a plurality of actions, the plurality of actions comprising:
        identifying computing devices that are likely to communicate with a same base station of a wireless carrier network;
        determining first monitoring data by monitoring the computing devices;
        adjusting a characteristic of the same base station;
        after adjusting the characteristic of the same base station, determining second monitoring data by monitoring the computing devices; and
        based on the first monitoring data and the second monitoring data, determining an effect that adjusting the characteristic of the same base station has on the wireless carrier network.

10. The system of claim 9, wherein identifying the computing devices that are likely to communicate with the same base station comprises:

identifying the computing devices that are likely to perform a similar action at a same time.

11. The system of claim 9, wherein:
the first monitoring data includes first communications parameters that reflect first characteristics of first communications between the computing devices and the same base station, and
the second monitoring data includes second communications parameters that reflect second characteristics of second communications between the computing devices and the same base station.

12. The system of claim 9, wherein adjusting a characteristic of the same base station comprises:
adjusting a technique that the same base station uses to communicate with the computing devices.

13. The system of claim 9, wherein the actions comprise:
training, using machine learning and historical data, a model that is configured to receive a given characteristic and output data identifying given computing devices,
wherein identifying the computing devices that are likely to communicate with the same base station comprises providing data identifying a common characteristic as an input to the model and receiving, from the model, data identifying the computing devices.

14. The system of claim 9, wherein the actions comprise:
based on the effect that adjusting the characteristic of the same base station has on the wireless carrier network and the computing devices, adjusting the characteristic of the same base station and other base stations of the wireless carrier network.

15. The system of claim 9, wherein the actions comprise:
receiving a request to determine the effect that adjusting the characteristic has on the wireless carrier network; and
based on the request to determine the effect that adjusting the characteristic has on the wireless carrier network, determine the common characteristic.

16. The method of claim 1, wherein:
determining the first monitoring data by monitoring the computing devices comprises:
receiving, from the computing devices, first device data that reflects first characteristics of the computing devices; and
determining first network data that reflects second characteristics of the wireless carrier network, and determining the second monitoring data by monitoring the computing devices comprises:
receiving, from the computing devices, second device data that reflects the first characteristics of the computing devices; and
determining second network data that reflects the second characteristics of the wireless carrier network.

17. One or more non-transitory computer-readable media of a computing device storing computer-executable instructions that upon execution cause one or more computers to perform acts comprising:
identifying computing devices that are likely to communicate with a same base station of a wireless carrier network;
determining first monitoring data by monitoring the computing devices;
adjusting a characteristic of the same base station;
after adjusting the characteristic of the same base station, determining second monitoring data by monitoring the computing devices; and
based on the first monitoring data and the second monitoring data, determining an effect that adjusting the characteristic of the same base station has on the wireless carrier network.

18. The media of claim 17, wherein:
the first monitoring data includes first communications parameters that reflect first characteristics of first communications between the computing devices and the same base station, and
the second monitoring data includes second communications parameters that reflect second characteristics of second communications between the computing devices and the same base station.

19. The media of claim 17, wherein adjusting a characteristic of the same base station comprises:
adjusting a technique that the same base station uses to communicate with the computing devices.

20. The media of claim 17, wherein the acts comprise:
based on the effect that adjusting the characteristic of the same base station has on the wireless carrier network and the computing devices, adjusting the characteristic of the same base station and other base stations of the wireless carrier network.

* * * * *